US012626524B2

(12) United States Patent
Pan et al.

(10) Patent No.:  US 12,626,524 B2
(45) Date of Patent:      May 12, 2026

(54) METHOD AND APPARATUS FOR GENERATING CAPTIONING DEVICE, AND METHOD AND APPARATUS FOR OUTPUTTING CAPTION

(71) Applicant: Jingdong Technology Holding Co., Ltd., Beijing (CN)

(72) Inventors: Yingwei Pan, Beijing (CN); Yehao Li, Beijing (CN); Ting Yao, Beijing (CN); Tao Mei, Beijing (CN)

(73) Assignee: Jingdong Technology Holding Co., Ltd., Beijing (CN)

( * ) Notice: Subject to any disclaimer, the term of this patent is extended or adjusted under 35 U.S.C. 154(b) by 387 days.

(21) Appl. No.: 18/284,225

(22) PCT Filed: Jan. 6, 2022

(86) PCT No.: PCT/CN2022/070476
§ 371 (c)(1),
(2) Date: Sep. 26, 2023

(87) PCT Pub. No.: WO2022/206094
PCT Pub. Date: Oct. 6, 2022

(65) Prior Publication Data
US 2024/0177506 A1      May 30, 2024

(30) Foreign Application Priority Data
Mar. 30, 2021    (CN) ........................ 202110338045.X

(51) Int. Cl.
*G06V 20/70*        (2022.01)
*G06V 40/30*        (2022.01)
*G06V 40/40*        (2022.01)

(52) U.S. Cl.
CPC .............. *G06V 20/70* (2022.01); *G06V 40/30* (2022.01); *G06V 40/40* (2022.01)

(58) Field of Classification Search
CPC ........ G06V 20/70; G06V 40/30; G06V 40/40; G06V 10/82; G06V 20/00; G06V 20/41;
(Continued)

(56) References Cited

U.S. PATENT DOCUMENTS

| | | | |
|---|---|---|---|
| 10,592,751 B2 | 3/2020 | Chen et al. | |
| 2005/0038643 A1 | 2/2005 | Koehn | |

(Continued)

FOREIGN PATENT DOCUMENTS

| | | |
|---|---|---|
| CN | 107608943 A | 1/2018 |
| CN | 110135567 A | 8/2019 |

(Continued)

OTHER PUBLICATIONS

Huang Yuan, et al., "Image Captioning Based on Conditional Generative Adversarial Nets," Journal of Computer-Aided Design & Computer Graphics, Jun. 2020, vol. 32, No. 6 (w/English abstract) [8 pages].

(Continued)

*Primary Examiner* — Andrew M Moyer
*Assistant Examiner* — Ahmed A Nasher
(74) *Attorney, Agent, or Firm* — ICE MILLER LLP; Justin D. Swindells

(57) ABSTRACT

A method and apparatus for generating a captioning device, and a method and apparatus for outputting a caption. The method for generating a captioning device comprises: acquiring a sample image set; inputting the sample image set into an image encoder of a sentence generator, so as to output an object set; grouping the object set into a first object set and a second object set, wherein the first object set is an object set that is included within a preset object set, and the second object set is an object set that is excluded from the preset object set; inputting, into a sentence decoder of the sentence generator, the object set output by the image (Continued)

encoder, and performing a beam search in a decoding step by taking the first object set and the second object set as constraint conditions, so as to generate a pseudo-image sentence pair set; and training the sentence generator by taking the pseudo-image sentence pair set as a sample set, so as to obtain a captioning device.

16 Claims, 5 Drawing Sheets

(58) Field of Classification Search
CPC .. G06V 10/764; G06V 30/413; G06F 18/214; G06F 40/30; G06F 16/532; G06F 16/334; G06N 3/044; H04N 21/4884; H04N 5/278; H04N 21/4314
See application file for complete search history.

(56) References Cited

U.S. PATENT DOCUMENTS

| | | |
|---|---|---|
| 2014/0369596 A1 | 12/2014 | Siskind et al. |
| 2017/0061250 A1 | 3/2017 | Gao et al. |
| 2017/0200065 A1 | 7/2017 | Wang et al. |
| 2018/0336226 A1 | 11/2018 | Anorga et al. |
| 2018/0373979 A1 | 12/2018 | Wang et al. |
| 2019/0377987 A1 | 12/2019 | Price et al. |
| 2021/0034981 A1 | 2/2021 | Feng et al. |
| 2022/0058340 A1* | 2/2022 | Aggarwal ............ G06N 3/0464 |
| 2023/0185844 A1* | 6/2023 | Aggarwal ................ G06N 3/09 706/11 |

FOREIGN PATENT DOCUMENTS

| | | |
|---|---|---|
| CN | 111126479 A | 5/2020 |
| CN | 111612103 A | 9/2020 |
| CN | 112084841 A | 12/2020 |
| CN | 112508048 A | 3/2021 |
| CN | 113052090 A | 6/2021 |
| JP | 2018124969 A | 8/2018 |
| JP | 2019036093 A | 3/2019 |

OTHER PUBLICATIONS

Yang-Yang Zhao, et al., "A Survey on Task-Oriented Dialogue Systems," Chinese Journal of Computers, Oct. 2020, vol. 43, No. 10 (w/English abstract) [35 pages].
First Office Action issued in JP Application No. 2023-559796, dated Oct. 21, 2024 [3 pages].
Office Action issued in Chinese Application No. 202110338045.X, dated Jun. 14, 2023.
Search Report (and translation) & Written Opinion issued in International Application No. PCT/CM2022/070476, mailed Mar. 3, 2022.

* cited by examiner

400

401

Acquiring a to-be-processed image

402

Inputting the image into a captioning device, and outputting a caption corresponding to the image

500

Apparatus for generating a captioning device

501

Acquisition unit

502

Encoding unit

503

Division unit

504

Decoding unit

505

Training unit

METHOD AND APPARATUS FOR GENERATING CAPTIONING DEVICE, AND METHOD AND APPARATUS FOR OUTPUTTING CAPTION

CROSS-REFERENCE TO RELATED APPLICATION

This application is a U.S. National Stage of International Application No. PCT/CN2022/070476, filed on Jan. 6, 2022, which claims the priority of Chinese Patent Application No. 202110338045.X, filed on Mar. 30, 2021 and entitled "Method and Apparatus for Generating Captioning Device, and Method and Apparatus for Outputting Caption," the entire disclosures of which are hereby incorporated by reference.

TECHNICAL FIELD

Embodiments of the present disclosure relate to the field of computer technology, and specifically, to a method and apparatus for generating a captioning device, and a method and apparatus for outputting a caption.

BACKGROUND

Image captioning is an emerging and rapidly developing research topic, which is a technique for automatically describing images by using natural language sentences.

SUMMARY

Embodiments of the present disclosure propose a method and apparatus for generating a captioning device, and a method and apparatus for outputting a caption.

Embodiments of the present disclosure provide a method for generating a captioning device, and the method includes: acquiring a sample image set; inputting the sample image set into an image encoder of a sentence generator to output an object set; dividing the object set into a first object set and a second object set, where the first object set is an object set included in a preset object set, and the second object set is an object set excluded from the preset object set; inputting the object set output by the image encoder into a sentence decoder of the sentence generator, and performing a beam search by using the first object set and the second object set as constraint conditions in a decoding step to generate a pseudo image-sentence pair set; and training the sentence generator by using the pseudo image-sentence pair set as a sample set to obtain a captioning device.

In some embodiments, the method further includes: optimizing the captioning device by at least one of: optimizing the captioning device by performing an adversarial training on the captioning device through a sentence discriminator; optimizing the captioning device through an inclusion degree of an object identified by the captioning device in a sentence output by the captioning device; or optimizing the captioning device through a semantic correlation between an image triplet and a corresponding generated sentence, where the image triplet includes a query image, a positive image, and a negative image.

In some embodiments, the optimizing the captioning device by performing an adversarial training on the captioning device through a sentence discriminator includes: extracting a preset first sample set, where each first sample includes an image and a corresponding true sentence; extracting a pre-established generative adversarial network, where the generative adversarial network includes a captioning device and the sentence discriminator, where the captioning device is configured to perform an image-encoding on an input image and then perform a sentence-decoding to obtain a pseudo sentence, and the sentence discriminator is configured to determine whether the input sentence is the pseudo sentence output by the captioning device; and selecting a first sample from the first sample set based on a machine learning method, and performing first training steps of: inputting an image in the selected first sample into the captioning device to output a pseudo sentence; inputting the pseudo sentence and a true sentence in the selected first sample into the sentence discriminator to output a discrimination result; calculating an accuracy rate of the sentence discriminator according to the output discrimination result; and determining that a training of the captioning device is completed in response to the accuracy rate reaching a preset value.

In some embodiments, the method further includes: calculating, in response to that the accuracy rate does not reach the preset value, an adversarial loss of the sentence discriminator, adjusting a relevant parameter of the sentence discriminator to reduce the adversarial loss, and re-selecting a first sample from the first sample set to continue performing the first training steps.

In some embodiments, the method further includes: calculating, in response to that the accuracy rate does not reach the preset value, an adversarial reward of the sentence discriminator, adjusting a relevant parameter of the sentence discriminator to increase the adversarial reward, and re-selecting a first sample from the first sample set to continue performing the first training steps.

In some embodiments, the optimizing the captioning device through an inclusion degree of an object identified by the captioning device in a sentence output by the captioning device includes: extracting a preset second sample set, where each second sample includes an image; and selecting a sample from the second sample set based on a machine learning method, and performing second training steps of: inputting an image in the selected second sample into an image encoder of the captioning device to output a sample object set; inputting the sample object set into a sentence decoder of the captioning device to output a pseudo sentence; calculating a confidence mean score of that the pseudo sentence contains sample objects of the sample object set as an object inclusion reward of the pseudo sentence; and determining that a training of the captioning device is completed in response to the object inclusion reward reaching a preset inclusion reward threshold.

In some embodiments, the method further includes: adjusting, in response to that the object inclusion reward does not reach the preset inclusion reward threshold, a relevant parameter of the captioning device to increase the object inclusion reward, and re-selecting a second sample from the second sample set to continue performing the second training steps.

In some embodiments, the optimizing the captioning device through a semantic correlation between an image triplet and a corresponding generated sentence includes: extracting a preset third sample set, where each third sample includes a query image, a positive image and a negative image, the positive image and the query image share at least two objects, and the negative image and the query image have no common object; and selecting a third sample from the third sample set based on a machine learning method, and performing third training steps of: inputting a query image, a positive image, and a negative image in the selected third sample into the captioning device to output a query sentence, a positive sentence, and a negative sentence, respectively; calculating a first semantic similarity of the query sentence and the positive sentence and calculating a second semantic similarity of the query sentence and the negative sentence; calculating a self-supervised triplet loss according to the first semantic similarity and the second semantic similarity; and determining that a training of the captioning device is completed in response to the self-supervised triplet loss being less than a preset loss threshold.

In some embodiments, the method further includes: adjusting, in response to the self-supervised triplet loss being not less than the preset loss threshold, a relevant parameter of the captioning device to reduce the self-supervised triplet loss, and re-selecting a third sample from the third sample set to continue performing the third training steps.

In some embodiments, the calculating a first semantic similarity of the query sentence and the positive sentence and calculating a second semantic similarity of the query sentence and the negative sentence includes: calculating, for the query sentence, the positive sentence and the negative sentence, an object-based probability distribution of each word in the sentences, performing a maximum pooling operation, and obtaining a query sentence feature, a positive sentence feature and a negative sentence feature, respectively; and calculating a first semantic similarity of the query sentence feature and the positive sentence feature and calculating a second semantic similarity of the query sentence feature and the negative sentence feature.

In some embodiments, the method further includes: adjusting, in response to a weighted sum of the adversarial reward, the object inclusion reward, and the self-supervised triplet loss is greater than a preset target value, a relevant parameters of the captioning device to reduce the weighted sum.

In some embodiments, the image encoder includes a two-layer LSTM with an area-level attention mechanism, where a first layer LSTM serves as a top-down attention module that calculates an object-level attention according to context information, and a second layer LSTM is a language model for generating a sentence.

Embodiments of the present disclosure further provide a method for outputting a caption, and the method includes: acquiring a to-be-processed image; and inputting the image into a captioning device generated by the method for generating a captioning device as described above, and outputting a caption corresponding to the image.

Embodiments of the present disclosure further provide an apparatus for generating a captioning device, and the apparatus includes: an acquisition unit configured to acquire a sample image set; an encoding unit configured to input the sample image set into an image encoder of a sentence generator to output an object set; a division unit configured to divide the object set into a first object set and a second object set, where the first object set is an object set included in a preset object set, and the second object set is an object set excluded from the preset object set; a decoding unit configured to input the object set output by the image encoder into a sentence decoder of the sentence generator, and perform a beam search by using the first object set and the second object set as constraint conditions in a decoding step to generate a pseudo image-sentence pair set; and a training unit configured to train the sentence generator by using the pseudo image-sentence pair set as a sample set to obtain a captioning device.

In some embodiments, the apparatus further includes an optimization unit configured to: optimize the captioning device by at least one of: optimizing the captioning device by performing an adversarial training on the captioning device through a sentence discriminator; optimizing the captioning device through an inclusion degree of an object identified by the captioning device in a sentence output by the captioning device; or optimizing the captioning device through a semantic correlation between an image triplet and a corresponding generated sentence, where the image triplet includes a query image, a positive image, and a negative image.

In some embodiments, the optimization unit is further configured to: extract a preset first sample set, where each first sample includes an image and a corresponding true sentence; extract a pre-established generative adversarial network, where the generative adversarial network includes a captioning device and the sentence discriminator, where the captioning device is configured to perform an image-encoding on an input image and then perform a sentence-decoding to obtain a pseudo sentence, and the sentence discriminator is configured to determine whether the input sentence is the pseudo sentence output by the captioning device; and select a first sample from the first sample set based on a machine learning method, and perform first training steps of: inputting an image in the selected first sample into the captioning device to output a pseudo sentence; inputting the pseudo sentence and a true sentence in the selected first sample into the sentence discriminator to output a discrimination result; calculating an accuracy rate of the sentence discriminator according to the output discrimination result; and determining that a training of the captioning device is completed in response to the accuracy rate reaching a preset value.

In some embodiments, the optimization unit is further configured to: calculate, in response to that the accuracy rate does not reach the preset value, an adversarial loss of the sentence discriminator, adjust a relevant parameter of the sentence discriminator to reduce the adversarial loss, and re-select a first sample from the first sample set to continue performing the first training steps.

In some embodiments, the optimization unit is further configured to: calculate, in response to that the accuracy rate does not reach the preset value, an adversarial reward of the sentence discriminator, adjust a relevant parameter of the sentence discriminator to increase the adversarial reward, and re-select a first sample from the first sample set to continue performing the first training steps.

In some embodiments, the optimization unit is further configured to: extract a preset second sample set, where each second sample includes an image; and select a sample from the second sample set based on a machine learning method, and perform second training steps of: inputting an image in the selected second sample into an image encoder of the captioning device to output a sample object set; inputting the sample object set into a sentence decoder of the captioning device to output a pseudo sentence; calculating a confidence mean score of that the pseudo sentence contains sample objects of the sample object set as an object inclusion reward of the pseudo sentence; and determining that a training of the captioning device is completed in response to the object inclusion reward reaching a preset inclusion reward threshold.

In some embodiments, the optimization unit is further configured to: adjust, in response to that the object inclusion reward does not reach the preset inclusion reward threshold, a relevant parameter of the captioning device to increase the object inclusion reward, and re-select a second sample from the second sample set to continue performing the second training steps.

In some embodiments, the optimization unit is further configured to: extract a preset third sample set, where each third sample includes a query image, a positive image and a negative image, the positive image and the query image share at least two objects, and the negative image and the query image have no common object; and select a third sample from the third sample set based on a machine learning method, and perform third training steps of: inputting a query image, a positive image, and a negative image in the selected third sample into the captioning device to output a query sentence, a positive sentence, and a negative sentence, respectively; calculating a first semantic similarity of the query sentence and the positive sentence and calculating a second semantic similarity of the query sentence and the negative sentence; calculating a self-supervised triplet loss according to the first semantic similarity and the second semantic similarity; and determining that a training of the captioning device is completed in response to that the self-supervised triplet loss is less than a preset loss threshold.

In some embodiments, the optimization unit is further configured to: adjust, in response to that the self-supervised triplet loss is not less than the preset loss threshold, a relevant parameter of the captioning device to reduce the self-supervised triplet loss, and re-select a third sample from the third sample set to continue performing the third training steps.

In some embodiments, the optimization unit is further configured to: calculate, for the query sentence, the positive sentence and the negative sentence, an object-based probability distribution of each word in the sentences, perform a maximum pooling operation, and obtain a query sentence feature, a positive sentence feature and a negative sentence feature, respectively; and calculate a first semantic similarity of the query sentence feature and the positive sentence feature and calculate a second semantic similarity of the query sentence feature and the negative sentence feature.

In some embodiments, the optimization unit is further configured to: adjust, in response to that a weighted sum of the adversarial reward, the object inclusion reward, and the self-supervised triplet loss is greater than a preset target value, a relevant parameters of the captioning device to reduce the weighted sum.

In some embodiments, the image encoder includes a two-layer LSTM with an area-level attention mechanism, where a first layer LSTM serves as a top-down attention module that calculates an object-level attention according to context information, and a second layer LSTM is a language model for generating a sentence.

Embodiments of the present disclosure further provide an apparatus for outputting a caption, and the apparatus includes: an acquisition unit configured to acquire a to-be-processed image; and an output unit configured to input the image into a captioning device generated by the method for generating a captioning device as described above, and output a caption corresponding to the image.

Embodiments of the present disclosure provide an electronic device, and the electronic device includes: one or more processors; and a storage apparatus storing one or more computer programs, where the one or more computer programs, when executed by the one or more processors, cause the one or more processors to implement the method for generating a captioning device as described above.

Embodiments of the present disclosure provide a computer readable medium storing a computer program, where the program, when executed by a processor, implements the method for generating a captioning device as described above.

BRIEF DESCRIPTION OF THE DRAWINGS

Through detailed descriptions of non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining the accompanying drawings and the embodiments. It should be understood that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
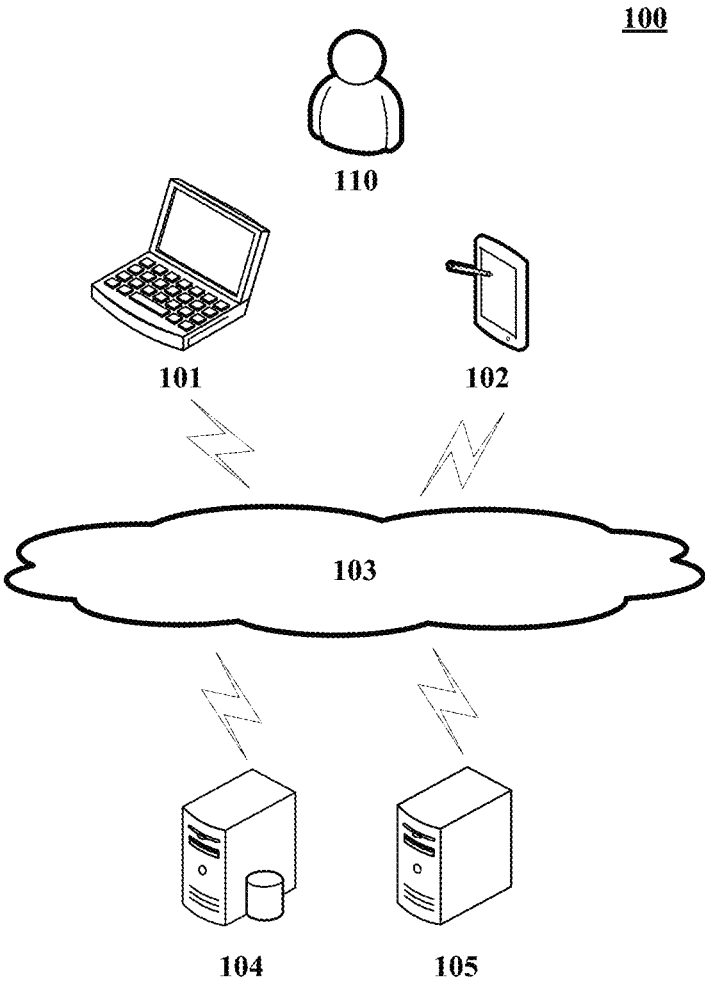
FIG. 1 is a diagram of an exemplary system architecture in which an embodiment of the present disclosure may be applied.

FIG. 1 illustrates an exemplary system architecture 100 in which a method or apparatus for generating a captioning device, or a method or apparatus for outputting a caption according to embodiments of the present disclosure may be applied.

As shown in FIG. 1, the system architecture 100 may include terminal devices 101 and 102, a network 103, a database server 104, and a server 105. The network 103 serves as a medium providing a communication link among the terminal devices 101 and 102, the database server 104, and the server 105. The network 103 may include various types of connections, such as wired or wireless communication links, or fiber optic cables.

The user 110 may use the terminal devices 101 and 102 to interact with the server 105 via the network 103, to receive or send a message, etc. Various client applications, such as model training applications, caption generation applications, image processing applications, shopping applications, payment applications, web browsers, and instant messaging tools, may be installed on the terminals 101 and 102.

The terminal devices 101 and 102 may be hardware or software. When being the hardware, the terminal devices 101 and 102 may be various electronic devices having a display screen, including but not limit to a smartphone, a tablet computer, an electronic book reader, an MP3 player (Moving Picture Experts Group Audio Layer III), a laptop computer, a desktop computer, and the like. When being the software, the terminal devices 101 and 102 may be installed on the above-listed electronic devices. The terminal devices 101 and 102 may be implemented as a plurality of pieces of software or a plurality of software modules (e.g., for providing a distributed service), or may be implemented as a single piece of software or a single software module, which is not specifically limited herein.

When the terminals 101 and 102 are the hardware, an image acquisition device may be installed thereon. The image acquisition device may be various devices capable of acquiring an image, such as a camera, a sensor, or the like. The user 110 may acquire images of various scenarios by using the image acquisition devices on the terminals 101 and 102.

The database server 104 may be a database server that provides various services. For example, a sample set may be stored in the database server. The sample set includes a large number of samples. The samples may include sample images and sentences corresponding to the sample images. In this way, the user 110 may select a sample from the sample set stored in the database server 104 through the terminals 101 and 102.

The server 105 may also be a server that provides various services, such as, a background server that provides support for various applications displayed on the terminals 101 and 102. The background server may train an initial model by using the samples in the sample set sent by the terminals 101 and 102, and may send a training result (e.g., a generated captioning device) to the terminals 101 and 102. In this way, the user can apply the generated captioning device to generate a caption for an image.

The database server 104 and the server 105 may also be hardware or software. When being the hardware, the servers may be implemented as distributed server clusters composed of a plurality of servers, or as single servers. When being the software, the servers may be implemented as a plurality of pieces of software or a plurality of software modules (e.g., for providing a distributed service), or may be implemented as a single piece of software or a single software module, which is not specifically limited herein.

It should be noted that the method for generating a captioning device or the method for outputting a caption provided by the embodiments of the present disclosure may be performed by the server 105. Accordingly, the apparatus for generating a captioning device or the apparatus for outputting a caption may be arranged in the server 105.

It should be noted that in the case where the server 105 may implement the functions of the database server 104, the database server 104 may not be arranged in the system architecture 100.

It should be understood that the number of the terminals, network, database server, and server in FIG. 1 is only illustrative. Depending on the implementation needs, any number of terminals, networks, database servers, and servers may be employed.

Figure 2:
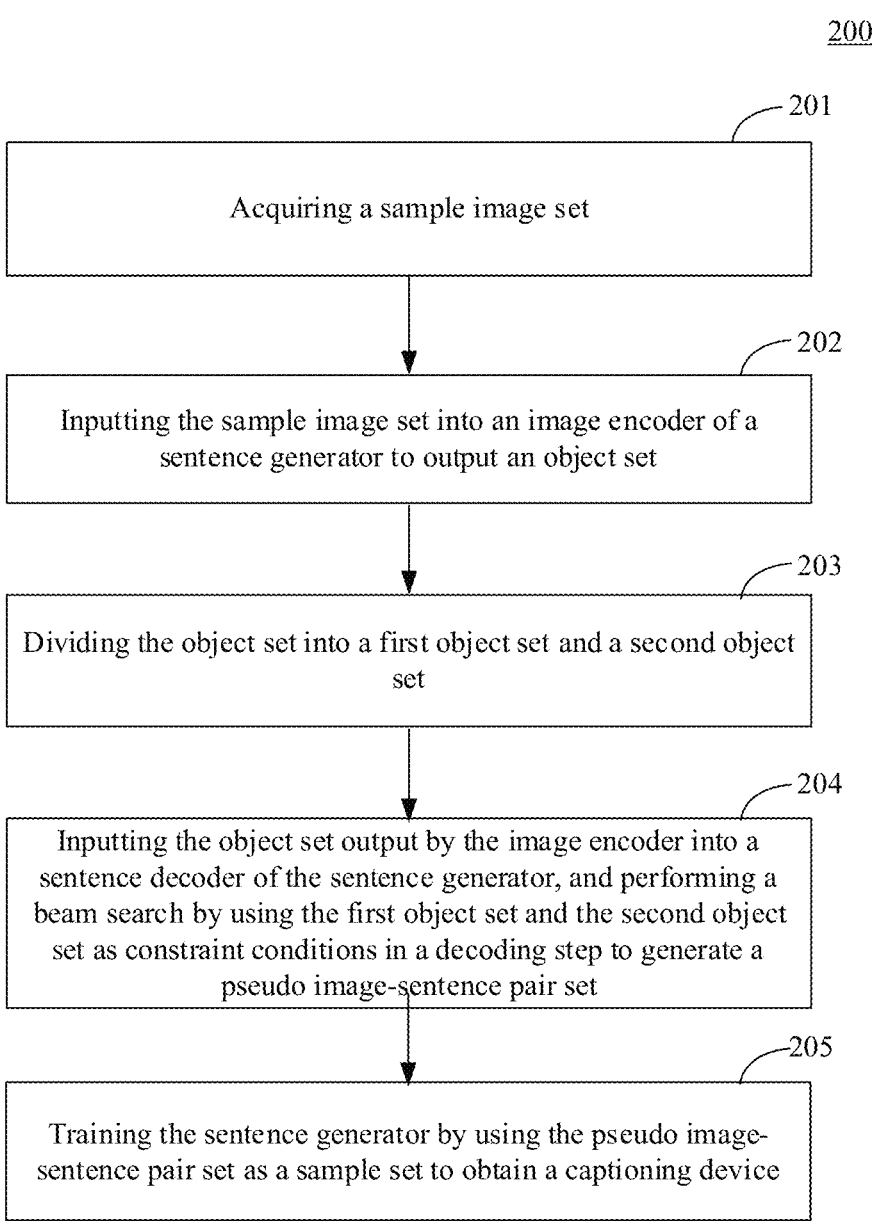
FIG. 2 is a flowchart of an embodiment of a method for generating a captioning device according to the present disclosure.

Further referring to FIG. 2, FIG. 2 illustrates a flow 200 of an embodiment of a method for generating a captioning device according to the present disclosure. The method for generating a captioning device includes the following steps.

Step 201, acquiring a sample image set.

In this embodiment, an executing body of the method for generating a captioning device (such as, the server shown in FIG. 1) may acquire a pre-stored sample image set from a database server, or may acquire an image captured by a terminal from the terminal as a sample image.

Step 202, inputting the sample image set into an image encoder of a sentence generator to output an object set.

In this embodiment, the sentence generator is an initial captioning device, and is a neural network that converts an input image into a sentence. The sentence generator may include an image encoder and a sentence decoder.

The image encoder generates an intermediate representation for each input image, and the present disclosure uses the most common object detection model (Faster R-CNN) as the image encoder to detect an object in the image. Other image encoders may also be used in practice. Each image $I_i$ is encoded into a set of salient image areas $$\mathcal{V}_i = \{\mathcal{V}_k\}_{k=1}^{K},$$

which contain K detected objects, such as a person, a flower, a grass, a tree, a chair, a dog, etc.

Step 203, dividing the object set into a first object set and a second object set.

In this embodiment, the first object set is an object set included in a preset object set, and the second object set is an object set excluded from the preset object set. Technically, given an input image $I_i$, an identified object set $$\left\{O_k, c_{(o_k)}\right\}_{k=1}^{K}$$

is output through an object detection model (e.g., Faster R-CNN), where $O_k$ is an identified object with the highest confidence score in the K-th image area, and $C_{(O_k)}$ is a corresponding confidence score. Based on the most common 80 detection objects in the COCO data set, the identified objects are re-divided into an object set to be included $$\mathcal{O}_R = \{O_r^R\}_{r=1}^{K_R}$$

and an object set to be excluded $$\mathcal{O}_E = \{O_e^E\}_{e=1}^{K_E}.$$

For example, a preset object set includes a house, an automobile, a person, a flower, a grass, and a tree, and an object set includes a person, a flower, a grass, a tree, a chair, and a dog. In this way, a first object set (an object set included in the preset object set) includes a person, a flower, a grass, a tree, and a second object set (an object set excluded from the preset object set) includes a chair and a dog.

Step 204, inputting the object set output by the image encoder into a sentence decoder of the sentence generator, and performing a beam search by using the first object set and the second object set as constraint conditions in a decoding step to generate a pseudo image-sentence pair set.

In this embodiment, given the intermediate representation generated by the image encoder, an output sentence is decoded word by word with the sentence decoder. Referring to the Bottom-up and Top-Down attention model, the sentence decoder may be implemented as a two-layer LSTM (Long Short-Term Memory) with an area-level attention mechanism. The first layer LSTM (LSTM$^1$) serves as a top-down attention module that calculates an object-level attention according to context information, while a second layer LSTM (LSTM$^2$) is a language model for generating a sentence. At each decoding step t, a hidden state $$h_{t-1}^2$$

of the second layer LSTM, a mean of encoded image features $$\bar{v} = \frac{1}{K}\sum_{k=1}^{K} v_k,$$

and an input word $w_{t-1}$ are considered as the context information and are fed into the first layer LSTM, thus obtaining a hidden state of the first layer LSTM:

$$h_t^1 = LSTM^1\left(\left[h_{t-1}^2, \bar{v}, W_\mu w_{t-1}\right], h_{t-1}^1\right)$$

where $W_\mu$ is a word embedding matrix, $w_{t-1}$ is a word encoding. An attention distribution of all K image areas is measured based on the hidden state $$h_t^1$$

as follows:

$$a_{t,k} = w_a^T \tanh\left(W_{va} v_k + W_{ha} h_t^1\right)$$

$$\lambda_t = \text{softmax}(a_t)$$

where $a_{t,k}$ denotes the k-th element of $$a_t, \text{ and } W_{va}, W_{ha}, w_a^T$$

are transformation matrices. An image feature is obtained by weighting using attention distribution:

$$\hat{v}_t = \sum_{k=1}^{K} \lambda_{t,k} v_k$$

where $\lambda_{t,k}$ is the k-th element of $\lambda_t$, representing an attention probability of the image region $v_k$. Then an image feature $\hat{v}_t$ and a hidden state $$h_t^1$$

are concatenated as an input of the second layer LSTM, obtaining the hidden state of the second layer LSTM:

$$h_t^2 = LSTM^2\left(\left[\hat{v}_t, h_t^1\right], h_{t-1}^2\right)$$

$$p(w_t) = \text{softmax}\left(W_E h_t^2\right)$$

where $W_E$ is a linear embedding matrix that projects $$h_t^2$$

onto a vocabulary space for a word prediction.

A natural method of generating a pseudo image-sentence pairs by a pre-trained captioning device is to employ a beam search, which is a heuristic search algorithm that holds a beam $B_t$ with b most likely partial sentences at each decoding step. However, the semantic correlation between the input image and the output sentence is not fully used for a sentence generation at the time of reasoning. To mitigate this problem, the present disclosure designs a semantic constrained beam search, which is a reconstructed beam search to ensure the inclusion of identified objects and the exclusion of irrelevant objects.

Technically, given an input image $I_i$, an identified object set $$\left\{O_k, c_{(o_k)}\right\}_{k=1}^{K}$$

is output through an object detection model (e.g., FasterR-CNN), where $O_k$ is an identified object with the highest confidence score in the K-th image area, and $C_{(O_k)}$ is a corresponding confidence score. Based on the most common 80 detection objects in the COCO data set, the identified objects are re-divided into an object set to be included $$\mathcal{O}_R = \left\{O_r^R\right\}_{r=1}^{K_R}$$

and an object set to be excluded $$\mathcal{O}_E = \left\{O_e^E\right\}_{e=1}^{K_E}.$$

Identifying an object in $\mathcal{O}_R$ and excluding an object in $\mathcal{O}_E$ are used as a constraint condition, and a finite-state machine is used to execute this constraint, so that the finite-state machine may identify word sequences that meet all object inclusion constraints, and then combine beam search with the finite-state machine. Specifically, for each state a∈ A in the finite-state machine, a search beam $$B_t^a$$

is maintained, and at each decoding step t, each beam $$B_t^a$$

is updated by retaining b most likely partial word sequences in a candidate set $$E_t^a:$$

$$E_i^a = \bigcup_{a' \in A} \{(w_{1:t-1}, w_t) | w_{1:t-1} \in B_{t-1}^{a'}, w_t \in V - O_E, \delta(a', w_t) = a\},$$

where $w_{1:t-1}$ represents that a length of an output sentence is $t-1$, V is a vocabulary, and $\delta$: $A \times \{V - O_E\} \rightarrow A$ is a state transition function in the finite-state machine. Here, only words in the vocabulary are looked up (excluding irrelevant objects in $O_E$) to extend the current partial word sequences. Therefore, the design of the finite-state machine requires that a word sequence of an accepted state must satisfy the inclusion condition while excluding all irrelevant objects.

In the pseudo image-sentence pair set, each pseudo image-sentence pair includes an image and a sentence, which may be unpaired.

Step 205, training the sentence generator by using the pseudo image-sentence pair set as a sample set to obtain a captioning device.

In this embodiment, the pseudo image-sentence pair set may be represented by $$P = \{I_i, S_i^*\}_{i=1}^{N_I}, \text{ where } S_i^* = \{w_t^*\}_{t=1}^{T}$$

represents a generated pseudo sentence. Using these pseudo image-sentence pairs, a captioning device with the following cross-entropy loss may be directly trained:

$$\mathcal{L}_{XE} = -\sum_{t=1}^{T} \log(p_\theta(w_t^* | w_0^*, \ldots w_{t-1}^*))$$

Here, $\theta$ represents a parameter of a sentence decoder.

In some alternative implementations of this embodiment, the method further includes: optimizing the captioning device by at least one of: optimizing the captioning device by performing an adversarial training on the captioning device through a sentence discriminator; optimizing the captioning device through an inclusion degree of an object identified by the captioning device in a sentence output by the captioning device; or optimizing the captioning device through a semantic correlation between an image triplet and a corresponding generated sentence, where the image triplet includes a query image, a positive image, and a negative image.

The captioning device may be optimized by any of the above methods, or a combination of any two of the above methods. Additionally, the three methods may be combined together to optimize the captioning device.

In some alternative implementations of this embodiment, the optimizing the captioning device by performing an adversarial training on the captioning device through a sentence discriminator includes: extracting a preset first sample set, where each first sample includes an image and a corresponding true sentence; extracting a pre-established generative adversarial network, where the generative adversarial network includes a captioning device and the sentence discriminator, where the captioning device is configured to perform an image-encoding on an input image and then perform a sentence-decoding to obtain a pseudo sentence, and the sentence discriminator is configured to determine whether the input sentence is the pseudo sentence output by the captioning device; and selecting a first sample from the first sample set based on a machine learning method, and performing first training steps of: inputting an image in the selected first sample into the captioning device to output a pseudo sentence; inputting the pseudo sentence and a true sentence in the selected first sample into the sentence discriminator to output a discrimination result; calculating an accuracy rate of the sentence discriminator according to the output discrimination result; and determining that a training of the captioning device is completed in response to the accuracy rate reaching a preset value.

If the accuracy rate does not reach the preset value, an adversarial loss of the sentence discriminator is calculated, a relevant parameter of the sentence discriminator is adjusted to reduce the adversarial loss, and a first sample is re-selected from the first sample set to continue performing the first training steps.

If the accuracy rate does not reach the preset value, an adversarial reward of the sentence discriminator is calculated, a relevant parameter of the sentence discriminator is adjusted to increase the adversarial reward, and a first sample is re-selected from the first sample set to continue performing the first training steps.

Figure 3:
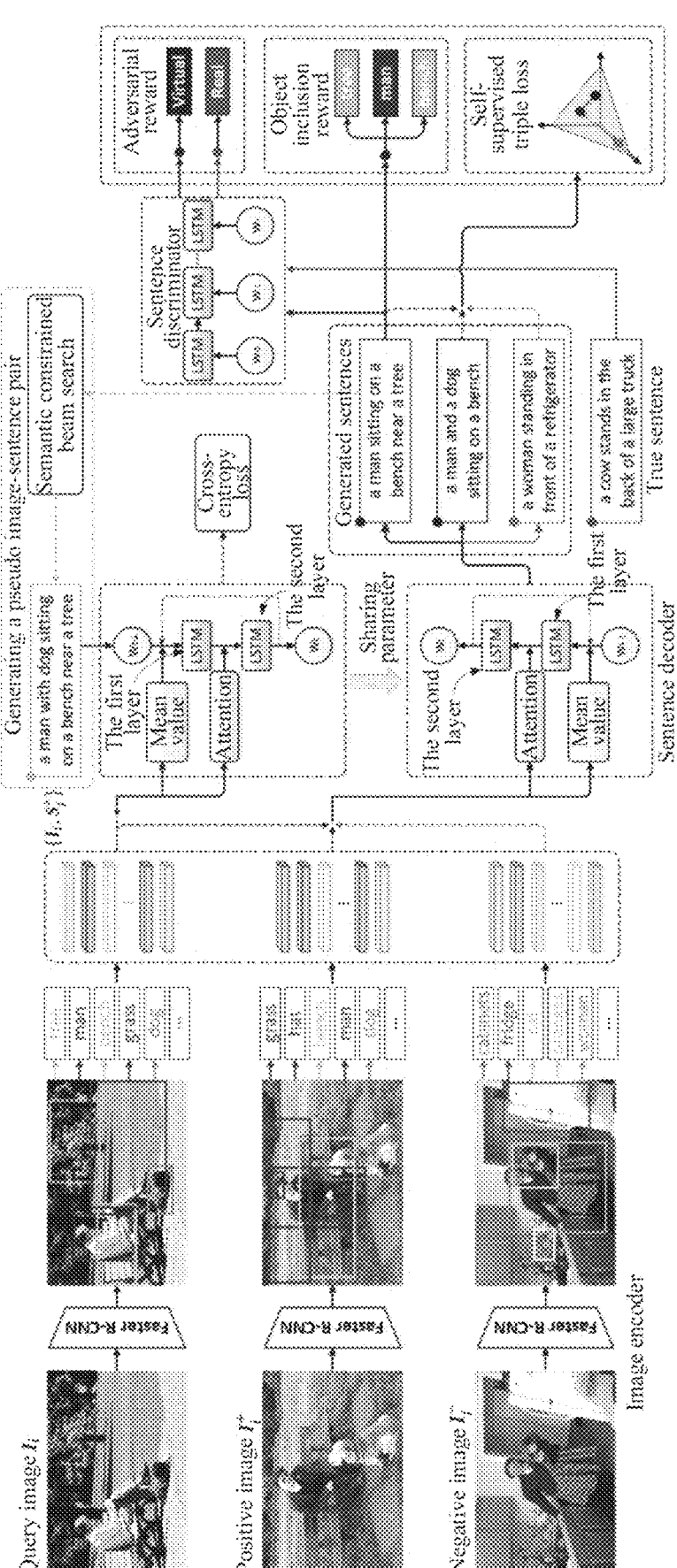
FIG. 3 is a schematic diagram of a scenario of the method for generating a captioning device according to the present disclosure.

A structure of the sentence discriminator is illustrated in FIG. 3. The sentence discriminator and the captioning device (including the image encoder and sentence decoder) constitute a generative adversarial network. The sentence discriminator is configured to distinguish whether an input sentence is a true sentence in an unpaired sentence data set or a pseudo sentence generated by the captioning device. Based on sentence modeling with a recurrent neural network (RNN), a word sequence may be contextually encoded into a sentence-level representation by using LSTM, to identify a true/generated sentence. Technically, given a sentence $$S = \{w_t\}_{t=1}^{T},$$

which contains T words, the LSTM in the sentence discriminator reads an input word sequence in natural order:

$$h_t^d = LSTM^d(W_\gamma w_{t-1}, h_{t-1}^d), t \in \{1 \ldots T\}$$

where $$h_t^d$$

represents an output hidden state at time t, and $W_\gamma \in \mathbb{R}^{D_E \times D_d}$ is a word embedding matrix. Then, a final output hidden state $$h_T^d$$

13 is used as the sentence-level representation. A probability of identifying a true sentence is generated by the following sigmoid function $\mathcal{D}$ (S) by using $$h_T^d:$$

$$\mathcal{D}(S) = \text{sigmoid}\left(W_{FC}\left(h_T^d\right)\right)$$

where $W_{FC}$ represents an embedding matrix of a fully connected layer.

In each training process, the sentence discriminator determines whether an input sentence is a true sentence or a pseudo sentence generated by the captioning device. Performing statistics to determine whether the discrimination results is correct, and if the accuracy rate reaches a preset value (e.g., 0.5), it indicates that the captioning device has achieved good results in generating pseudo sentences that may deceive the sentence discriminator, and the training is completed. Otherwise, the network parameters of the captioning device and the sentence discriminator need to be adjusted, and the training is performed again. The parameters of the captioning device may be fixed first, and the training is performed by adjusting the parameters of the sentence discriminator, and then the parameters of the sentence discriminator are fixed, and the training is performed by adjusting the parameters of the captioning device. The parameters of the sentence discriminator and the captioning device are alternately adjusted, and finally, the training of the sentence discriminator and the captioning device is completed. However, in practical applications, the captioning device is used.

Adversarial reward is used to generate sentences that are indistinguishable from captions written by humans, the present disclosure employs adversarial training and sentence-level adversarial reward to match a generated sentence distribution with a manually described sentence distribution. Technically, an image captioning device $\mathcal{G}$ is considered as a sentence generator that captures data distributions to generate a sentence. A sentence discriminator D takes a sentence randomly selected from either a true sentence or a sentence generated by $\mathcal{G}$ as an input and generates a probability distribution $\mathcal{D}$ (S) on the two sentence sources (i.e., the generated sentence or the true sentence). After the adversarial training, the image captioning device and the sentence discriminator are trained in a two-player game. Specifically, the sentence discriminator D is optimized by correctly distinguishing a true sentence $\{S_i\}$ and a generated sentence $\{\hat{S}_i\}$, i.e., by minimizing the adversarial loss:

$$\mathcal{L}_{adv} = -\log(\mathcal{D}(S_i)) - \log\left(1 - \mathcal{D}(\hat{S}_i)\right)$$

At the same time, the image captioning device $\mathcal{G}$ learns by maximizing the adversarial reward $r_{adv}$ in order to fool the sentence discriminator with a generated sentence:

$$r_{adv}\left(\hat{S}_i\right) = \log\left(\mathcal{D}(\hat{S}_i)\right)$$

14

The accuracy of the captioning device can be improved through the generative adversarial network.

In some alternative implementations of this embodiment, the optimizing the captioning device through an inclusion degree of an object identified by the captioning device in a sentence output by the captioning device includes: extracting a preset second sample set, where each second sample includes an image; and selecting a sample from the second sample set based on a machine learning method, and performing second training steps of: inputting an image in the selected second sample into an image encoder of the captioning device to output a sample object set; inputting the sample object set into a sentence decoder of the captioning device to output a pseudo sentence; calculating a confidence mean score of that the pseudo sentence contains sample objects of the sample object set as an object inclusion reward of the pseudo sentence; determining that a training of the captioning device is completed in response to the object inclusion reward reaching a preset inclusion reward threshold.

If the object inclusion reward does not reach the preset inclusion reward threshold, a relevant parameter of the captioning device is adjusted to increase the object inclusion reward, and a second sample is re-selected from the second sample set to continue performing the second training steps.

Regarding Object Inclusion Reward (OIR), since the adversarial reward only reinforces the captioning device to generate more realistic sentences without explicitly describing the semantic relationship between the image content and the generated sentences, the present disclosure further regards an inclusion degree of an identified object in an output sentence as an additional self-supervised objective, i.e., the object inclusion reward, to encourage the captioning device to describe that generated sentences include identified objects. In this way, the semantic correlation between the two is emphasized, and the quality of the generated captions is enhanced. Specifically, the present disclosure uses all identified objects to construct an inclusion objects set $$\mathcal{O}_i = \{o_k\}_{k=1}^K.$$

Given a generated sentence $$\hat{S}_i = \{\hat{w}_t\}_{t=1}^T,$$

an object inclusion reward is constructed by calculating a confidence mean score of objects of a sentence, where the objects are included in the set $\mathcal{O}_i$:

$$I(\hat{w}_t) = \begin{cases} \eta, & \text{if } \hat{w}_t \in O_i \\ 0, & \text{if } \hat{w}_t \notin O_i \end{cases}$$

$$r_{obj}\left(\hat{S}_i\right) = \sum_{t=1}^T I(\hat{w}_t) c_{(\hat{w}_t)}$$

where $I(\hat{w}_t)$ is an index function, and $c_{(\hat{w}_t)}$ represents a corresponding confidence score of an identified object, and some objects have low confidence, so that the weight is reduced accordingly.

In some alternative implementations of this embodiment, the optimizing the captioning device through a semantic correlation between an image triplet and a corresponding generated sentence includes: extracting a preset third sample set, where each third sample includes a query image, a positive image and a negative image, the positive image and the query image share at least two objects, and the negative image and the query image have no common object; and selecting a third sample from the third sample set based on a machine learning method, and performing third training steps of: inputting a query image, a positive image, and a negative image in the selected third sample into the captioning device to output a query sentence, a positive sentence, and a negative sentence, respectively; calculating a first semantic similarity of the query sentence and the positive sentence and calculating a second semantic similarity of the query sentence and the negative sentence; calculating a self-supervised triplet loss according to the first semantic similarity and the second semantic similarity; and determining that a training of the captioning device is completed if the self-supervised triplet loss is less than a preset loss threshold.

If the self-supervised triplet loss is not less than the preset loss threshold, a relevant parameter of the captioning device is adjusted to reduce the self-supervised triplet loss, and a third sample is re-selected from the third sample set to continue performing the third training steps.

In some alternative implementations of this embodiment, the calculating a first semantic similarity of the query sentence and the positive sentence and calculating a second semantic similarity of the query sentence and the negative sentence includes: calculating, for the query sentence, the positive sentence and the negative sentence, an object-based probability distribution of each word in the sentences, performing a maximum pooling operation, and obtaining a query sentence feature, a positive sentence feature and a negative sentence feature, respectively; and calculating a first semantic similarity of the query sentence feature and the positive sentence feature and calculating a second semantic similarity of the query sentence feature and the negative sentence feature.

Regarding self-supervised triplet loss, in an optimization with an object inclusion award, a semantic correlation between each image and a corresponding generated sentence is independently used, regardless of whether the relationship between the images is similar or dissimilar. Starting from the idea of exploring relative relationships, the present disclosure designs a self-supervised triplet loss that semantically constrains the learning of the captioning device in a triplet manner in order to preserve the relative semantic order between sentences. Each image triplet (consisting of a query image, a positive image, and a negative image) is constructed based on a visual object identified in the image. The positive image and the query image share at least two objects, while the negative image and the query image have no common object. Given such an image triplet, the captioning device is optimized so that a generated sentence of the query image is more similar to a generated sentence of the positive image than a generated sentence of the negative image. Specifically, it is assumed that there is a set $\mathcal{T}$ of triplets, where each triplet $$\{I_i, I_i^+, I_i^-\}$$

includes a query image $I_i$, a positive image $$I_i^+,$$

and a negative image $$I_i^-,$$

such a triplet is input into the captioning device to generate a corresponding sentence triplet $$\{S_i, S_i^+, S_i^-\},$$

which aims to make $S_i$ in the sentence triplet generated by the captioning device semantically closer to $$S_i^+$$

and further from $$S_i^-.$$

Therefore, a formula for the self-supervised triplet loss is as follows:

$$\mathcal{L}_{tri} = \max\left(0, \alpha - \left\|\mathcal{F}(\hat{S}_i) - \mathcal{F}(\hat{S}_i^-)\right\|_2^2 + \left\|\mathcal{F}(\hat{S}_i) - \mathcal{F}(\hat{S}_i^+)\right\|_2^2\right)$$

where $\alpha$ represents a margin, $\mathcal{F}(\hat{S}_i)$ represents an object-based sentence feature of $\hat{S}_i$, and specifically, in a decoding stage, a predicted word distribution is further transformed into an object-based distribution by only retaining the probability of 1600 objects. Next, all object-based distributions along the decoding process of $\hat{S}_i$ are accumulated and a maximum pooling is performed on them to generate corresponding object-based sentence features.

Alternatively, the training of the final entire model may incorporate an adversarial reward, an object inclusion reward, and a self-supervised triplet loss in a self-critical sequence training, and the overall objective gradient formula is approximately as follows:

$$\nabla_\theta \mathcal{L}_R = -\left[\lambda_1 r_{adv}(w_{1:T}^s) + \lambda_2 r_{obj}(w_{1:T}^s) - b\right]\nabla_\theta \log p_\theta(w_{1:T}^s) + \lambda_3 \nabla_\theta \mathcal{L}_{tri}$$

where $$w_{1:T}^s$$

represents a sampled sentence, b represents a combination of obtained adversarial and object inclusion rewards. $\lambda_1$, $\lambda_2$, $\lambda_3$ represent weights for an adversarial reward, an object inclusion reward, and a self-supervised triplet loss, respectively, and the weight may be 0.

Further referring to FIG. 3, FIG. 3 is a schematic diagram of a scenario of the method for generating a captioning device according to this embodiment. In the application scenario of FIG. 3, a query image, a positive image, and a negative image are input to an image encoder Faster R-CNN of a captioning device to obtain an object set {a tree, a man, a bench, a grass, a dog, etc.}. The object set are divided according to a preset object set and then input to a sentence decoder (the two-layer LSTM structure below in FIG. 3) of the captioning device, and a beam search decoding is performed based on semantics of the object set to generate pseudo sentences "a man sitting on a bench near a tree" and the like. These pseudo sentences and corresponding images are used as a pseudo image-sentence pair set for training the captioning device (the two-layer LSTM structure above in FIG. 3 represents a sentence decoder). For simplicity, parameters of the image encoder may be fixed, only the sentence decoder may be trained, or the image encoder may be trained after the training of the sentence decoder is completed, and the image encoder and the sentence decoder may be alternately trained to obtain the captioning device with the best performance. Cross-entropy is used during the training. The obtained parameters of the above two-layer LSTM structure may be shared with the below two-layer LSTM structure.

To further optimize the captioning device, an adversarial reward, an object inclusion reward, and a self-supervised triple loss may be introduced.

1. An adversarial reward optimization: The true sentence "a cow stands in the back of a large truck" and a pseudo sentence generated by the captioning device are input to the sentence discriminator for discrimination. If the accuracy rate of the discrimination does not reach 0.5, the parameters of the sentence discriminator are adjusted in the direction of minimizing the adversarial loss, and then the parameters of the captioning device are adjusted in the direction of maximizing the adversarial reward. Alternately training (adjusting) the sentence discriminator and the captioning device may optimize the captioning device.

2. An object inclusion reward optimization: The inclusion degree of the identified objects in the pseudo sentence generated by the captioning device is calculated. For example, the identified objects include a tree, a man, a bench. If sentence 1 includes a tree (confidence score of 0.9), and sentence 2 includes a tree (confidence score of 0.8) and a man (confidence score of 0.7), the object inclusion reward of sentence 2 is higher than that of sentence 1. The purpose of training is to maximize the object inclusion reward, and the object inclusion reward may be improved with each parameter adjustment.

3. A self-supervised triple loss optimization: The input samples in FIG. 3 may be a triplet: a query image, a positive image, and a negative image. Different images may generate different pseudo sentences, and the self-supervised triple loss is determined by comparing the semantic similarity among the query sentence, the positive sentence, and the negative sentence. The purpose of the training is to reduce the self-supervised triple loss, so that the semantic of the positive sentence is closer to that of the query sentence, and the semantic of the negative sentence is irrelevant to that of the query sentence.

In the training stage, the present disclosure adopts a self-learning mode and optimizes the entire model by alternately performing two process of generating pseudo caption pairs and re-training the captioning device, achieving the purpose of iteratively improving the captioning device.

The present disclosure proposes a self-learning framework based on semantic constraints, which deeply studies the self-learning idea of unpaired image captioning device. From the perspective of establishing a pseudo sentence generation and iterative optimization, this problem is studied to gradually improve the quality of sentence generation. In addition, the semantic constraints are well integrated into the model, fully utilizing the semantic guidance of objects in the image to train the captioning device, thereby obtaining an advanced unsupervised captioning technology.

Figure 4:
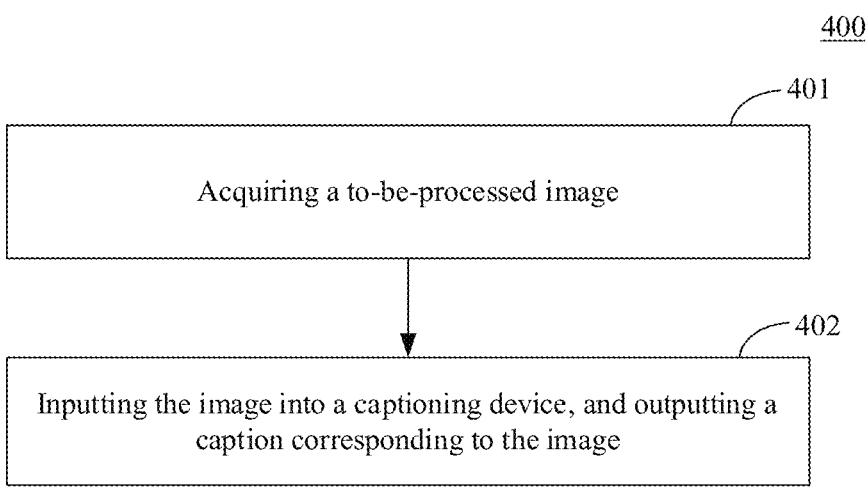
FIG. 4 is a flowchart of an embodiment of a method for outputting a caption according to the present disclosure.

Further referring to FIG. 4, FIG. 4 illustrates a flow 400 of another embodiment of a method for outputting a caption. The flow 400 of the method for outputting a caption includes the following steps.

Step 401, acquiring a to-be-processed image.

In this embodiment, an electronic device (such as a server shown in FIG. 1) on which the method for outputting a caption operates may receive a to-be-processed image from a terminal with which a user edits a caption through a wired connection or a wireless connection. The to-be-processed image may be a separate image or a video file, and the server obtains to-be-processed the image after framing the video.

Step 402, inputting the image into a captioning device, and outputting a caption corresponding to the image.

In this embodiment, the captioning device is trained according to the method of steps 201-205. The caption may be automatically assigned to the image through the captioning device. The caption may be directly output to the image, or generated as a separate file and returned to the terminal. The terminal sets the format of the caption according to the requirements of the user, and then outputs the caption to the image. The captioning device may not only input captions, but also output objects identified by the image encoder, which may be used for semantic constraints in the training process.

Steps 401-402 may be performed alternately with steps 201-205. The caption generated in steps 401-402 may be used as a training sample of steps 201-205.

As can be seen from FIG. 4, the flow 400 of the method for outputting a caption in this embodiment embodies the application steps of the captioning device as compared to the corresponding embodiment of FIG. 2. Therefore, according to the solution described in this embodiment, the training samples may be generated by the captioning device, and then used for the training of the captioning device, and by alternately generating the caption and re-training the captioning device, the captioning device may be optimized and the accuracy of generating the caption may be improved.

Figure 5:
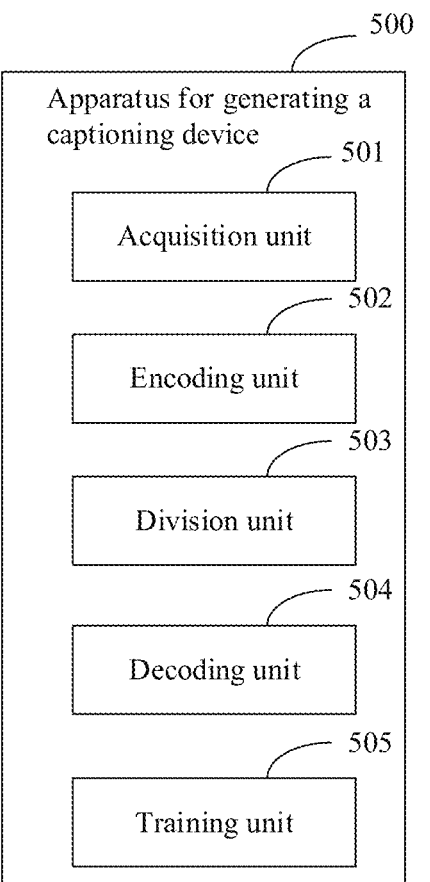
FIG. 5 is a schematic structural diagram of an embodiment of an apparatus for generating a captioning device according to the present disclosure.

Further referring to FIG. 5, as an implementation of the method shown in the above drawings, the present disclosure provides an embodiment of an apparatus for generating a captioning device. The embodiment of the apparatus corresponds to the embodiment of the method shown in FIG. 2. The apparatus may be applied in various electronic devices.

As shown in FIG. 5, an apparatus 500 for generating a captioning device of this embodiment includes: an acquisition unit 501, an encoding unit 502, a division unit 503, a decoding unit 504, and a training unit 505. The acquisition unit 501 is configured to acquire a sample image set; the encoding unit 502 is configured to input the sample image set into an image encoder of a sentence generator to output an object set; the division unit 503 is configured to divide the object set into a first object set and a second object set, where the first object set is an object set included in a preset object set, and the second object set is an object set excluded from the preset object set; the decoding unit 504 is configured to input the object set output by the image encoder into a sentence decoder of the sentence generator, and perform a beam search by using the first object set and the second object set as constraint conditions in a decoding step to generate a pseudo image-sentence pair set; and the training unit 505 is configured to train the sentence generator by using the pseudo image-sentence pair set as a sample set to obtain a captioning device.

In this embodiment, the specific processing of the acquisition unit 501, the encoding unit 502, the division unit 503, the decoding unit 504, and the training unit 505 of the apparatus 500 for generating a captioning device may refer to step 201, step 202, step 203, step 204, and step 205 in the corresponding embodiment of FIG. 2.

In some alternative implementations of this embodiment, the apparatus further includes an optimization unit (not shown in the figure) configured to: optimize the captioning device by at least one of: optimizing the captioning device by performing an adversarial training on the captioning device through a sentence discriminator; optimizing the captioning device through an inclusion degree of an object identified by the captioning device in a sentence output by the captioning device; or optimizing the captioning device through a semantic correlation between an image triplet and a corresponding generated sentence, where the image triplet includes a query image, a positive image, and a negative image.

In some alternative implementations of this embodiment, the optimization unit is further configured to: extract a preset first sample set, where each first sample includes an image and a corresponding true sentence; extract a pre-established generative adversarial network, where the generative adversarial network includes a captioning device and the sentence discriminator, where the captioning device is configured to perform an image-encoding on an input image and then perform a sentence-decoding to obtain a pseudo sentence, and the sentence discriminator is configured to determine whether the input sentence is the pseudo sentence output by the captioning device; and select a first sample from the first sample set based on a machine learning method, and perform first training steps of: inputting an image in the selected first sample into the captioning device to output a pseudo sentence; inputting the pseudo sentence and a true sentence in the selected first sample into the sentence discriminator to output a discrimination result; calculating an accuracy rate of the sentence discriminator according to the output discrimination result; and determining that a training of the captioning device is completed in response to the accuracy rate reaching a preset value.

In some alternative implementations of this embodiment, the optimization unit is further configured to: calculate, in response to that the accuracy rate does not reach the preset value, an adversarial loss of the sentence discriminator, adjust a relevant parameter of the sentence discriminator to reduce the adversarial loss, and re-select a first sample from the first sample set to continue performing the first training steps.

In some alternative implementations of this embodiment, the optimization unit is further configured to: calculate, in response to that the accuracy rate does not reach the preset value, an adversarial reward of the sentence discriminator, adjust a relevant parameter of the sentence discriminator to increase the adversarial reward, and re-select a first sample from the first sample set to continue performing the first training steps.

In some alternative implementations of this embodiment, the optimization unit is further configured to: extract a preset second sample set, where each second sample includes an image; and select a sample from the second sample set based on a machine learning method, and perform second training steps of: inputting an image in the selected second sample into an image encoder of the captioning device to output a sample object set; inputting the sample object set into a sentence decoder of the captioning device to output a pseudo sentence; calculating a confidence mean score of that the pseudo sentence contains sample objects of the sample object set as an object inclusion reward of the pseudo sentence; and determining that a training of the captioning device is completed if the object inclusion reward reaches a preset inclusion reward threshold.

In some alternative implementations of this embodiment, the optimization unit is further configured to: adjust, in response to that the object inclusion reward does not reach the preset inclusion reward threshold, a relevant parameter of the captioning device to increase the object inclusion reward, and re-select a second sample from the second sample set to continue performing the second training steps.

In some alternative implementations of this embodiment, the optimization unit is further configured to: extract a preset third sample set, where each third sample includes a query image, a positive image and a negative image, the positive image and the query image share at least two objects, and the negative image and the query image have no common object; and select a third sample from the third sample set based on a machine learning method, and perform third training steps of: inputting a query image, a positive image, and a negative image in the selected third sample into the captioning device to output a query sentence, a positive sentence, and a negative sentence, respectively; calculating a first semantic similarity of the query sentence and the positive sentence and calculating a second semantic similarity of the query sentence and the negative sentence; calculating a self-supervised triplet loss according to the first semantic similarity and the second semantic similarity; and determining that a training of the captioning device is completed in response to the self-supervised triplet loss being less than a preset loss threshold.

In some alternative implementations of this embodiment, the optimization unit is further configured to: adjust, in response to the self-supervised triplet loss being not less than the preset loss threshold, a relevant parameter of the captioning device to reduce the self-supervised triplet loss, and re-select a third sample from the third sample set to continue performing the third training steps.

In some alternative implementations of this embodiment, the optimization unit is further configured to: calculate, for the query sentence, the positive sentence and the negative sentence, an object-based probability distribution of each word in the sentences, perform a maximum pooling operation, and obtain a query sentence feature, a positive sentence feature and a negative sentence feature, respectively; and calculate a first semantic similarity of the query sentence feature and the positive sentence feature and calculate a second semantic similarity of the query sentence feature and the negative sentence feature.

In some alternative implementations of this embodiment, the optimization unit is further configured to: adjust, in response to that a weighted sum of the adversarial reward, the object inclusion reward, and the self-supervised triplet loss is greater than a preset target value, a relevant parameters of the captioning device to reduce the weighted sum.

In some alternative implementations of this embodiment, the image encoder includes a two-layer LSTM with an area-level attention mechanism, where a first layer LSTM serves as a top-down attention module that calculates an object-level attention according to context information, and a second layer LSTM is a language model for generating a sentence.

Figure 6:
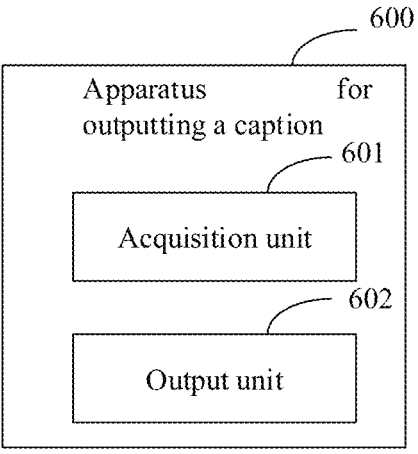
FIG. 6 is a schematic structural diagram of an embodiment of an apparatus for outputting a caption according to the present disclosure.

Further referring to FIG. 6, as an implementation of the method shown in the above drawings, the present disclosure provides an embodiment of an apparatus for outputting a caption. The embodiment of the apparatus corresponds to the embodiment of the method shown in FIG. 4. The apparatus may be applied in various electronic devices.

As shown in FIG. 6, an apparatus 600 for outputting a caption of this embodiment includes: an acquisition unit 601 configured to acquire a to-be-processed image; and an output unit 602 configured to input the image into a captioning device generated by the apparatus 500, and output a caption corresponding to the image.

According to an embodiment of the present disclosure, the present disclosure further provides an electronic device and a readable storage medium.

Figure 7:
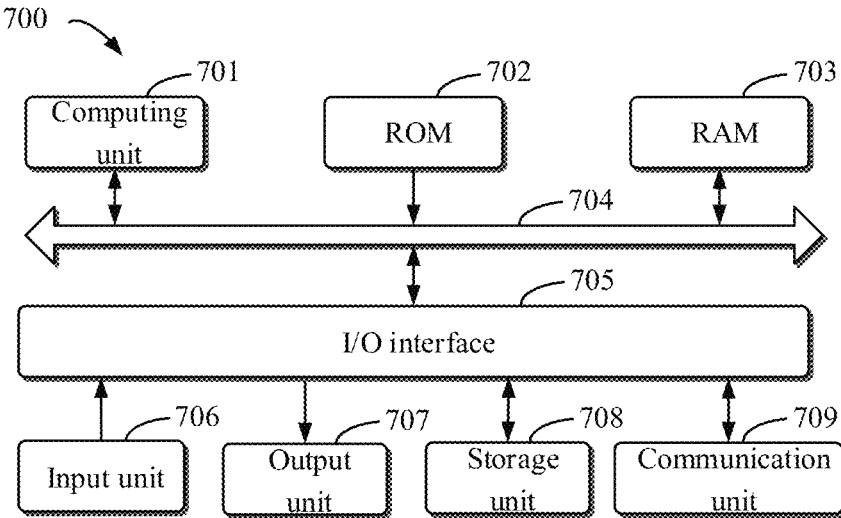
FIG. 7 is a schematic structural diagram of a computer system of an electronic device adapted to implement embodiments of the present disclosure.

FIG. 7 is a schematic block diagram of an exemplary electronic device 700 that may be used to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processer, a cellular telephone, a smart phone, a wearable device and other similar computing apparatuses. The parts shown herein, their connections and relationships, and their functions are only as examples, and not intended to limit implementations of the present disclosure as described and/ or claimed herein.

As shown in FIG. 7, the device 700 includes a computing unit 701, which may perform various appropriate actions and processing, based on a computer program stored in a read-only memory (ROM) 702 or a computer program loaded from a storage unit 708 into a random access memory (RAM) 703. In the RAM 703, various programs and data required for the operation of the device 700 may also be stored. The computing unit 701, the ROM 702, and the RAM 703 are connected to each other through a bus 704. An input/output (I/O) interface 705 is also connected to the bus 704.

A plurality of parts in the device 700 are connected to the I/O interface 705, including: an input unit 706, for example, a keyboard and a mouse; an output unit 707, for example, various types of displays and speakers; the storage unit 708, for example, a disk and an optical disk; and a communication unit 709, for example, a network card, a modem, or a wireless communication transceiver. The communication unit 709 allows the device 700 to exchange information/data with other devices over a computer network such as the Internet and/or various telecommunication networks.

The computing unit 701 may be various general-purpose and/or dedicated processing components having processing and computing capabilities. Some examples of the computing unit 701 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 701 performs the various methods and processes described above, such as a method for generating a captioning device. For example, in some embodiments, a method for generating a captioning device may be implemented as a computer software program, which is tangibly included in a machine readable medium, such as the storage unit 708. In some embodiments, part or all of the computer program may be loaded and/or installed on the device 700 via the ROM 702 and/or the communication unit 709. When the computer program is loaded into the RAM 703 and executed by the computing unit 701, one or more steps of a method for generating a captioning device described above may be performed. Alternatively, in other embodiments, the computing unit 701 may be configured to perform a method for generating a captioning device by any other appropriate means (for example, by means of firmware).

The method and apparatus for generating a captioning device, as well as the method and apparatus for outputting a caption provided by the embodiments of the present disclosure aim to provide an unsupervised solution for image captioning. Unlike existing image captioning methods that heavily rely on a large number of image-sentence pairs for training, the present disclosure eliminates this dependence by learning the image captioning device in a self-learning way. The captioning device may be trained with unpaired images and sentences data to pursue more realistic scenarios.

Various embodiments of the systems and technologies described above can be implemented in digital electronic circuit system, integrated circuit system, field programmable gate array (FPGA), application specific integrated circuit (ASIC), application special standard product (ASSP), system on chip (SOC), complex programmable logic device (CPLD), computer hardware, firmware, software, and/or combinations thereof. These various embodiments may include being implemented in one or more computer programs that may be executed and/or interpreted on a programmable system including at least one programmable processor, which may be a dedicated or general programmable processor that may receive data and instructions from a storage system, at least one input device, and at least one output device, and transmit data and instructions to the storage system, the at least one input device, and the at least one output device.

Program codes for implementing the method of the present disclosure may be written in any combination of one or more programming languages. These program codes may be provided to a processor or controller of a general purpose computer, special purpose computer or other programmable apparatus for data processing such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In order to provide interaction with the user, the systems and techniques described herein may be implemented on a computer having: a display device for displaying information to the user (e.g., a CRT (cathode ray tube) or LCD (liquid crystal display) monitor); a keyboard and a pointing device (e.g., mouse or trackball), through which the user can provide input to the computer. Other kinds of devices can also be used to provide interaction with users. For example, the feedback provided to the user may be any form of sensory feedback (e.g., visual feedback, auditory feedback, or tactile feedback); and the input from the user can be received in any form (including acoustic input, voice input or tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a server for a distributed system or a server combined with a blockchain. The server may alternatively be a cloud server, or an intelligent cloud computing server or an intelligent cloud host with artificial intelligence technology. The server may be a server for a distributed system or a server combined with a blockchain. The server may alternatively be a cloud server, or an intelligent cloud computing server or an intelligent cloud host with artificial intelligence technology.

It should be understood that the various forms of processes shown above may be used to reorder, add, or delete steps. For example, the steps disclosed in the present disclosure may be executed in parallel, sequentially, or in different orders, as long as the desired results of the technical solutions mentioned in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for generating a captioning device, comprising the steps of:
acquiring a sample image set;
inputting the sample image set into an image encoder of a sentence generator to output an object set;
dividing the object set into a first object set and a second object set, wherein the first object set is an object set included in a preset object set, and the second object set is an object set excluded from the preset object set;
inputting the object set output by the image encoder into a sentence decoder of the sentence generator, and performing a beam search by using the first object set and the second object set as constraint conditions in a decoding step to generate a pseudo image-sentence pair set; and
training the sentence generator by using the pseudo image-sentence pair set as a sample set to obtain the captioning device.

2. The method according to claim 1, wherein the method further comprises the steps of:
optimizing the captioning device by at least one of:
optimizing the captioning device by performing an adversarial training on the captioning device through a sentence discriminator;
optimizing the captioning device through an inclusion degree of an object identified by the captioning device in a sentence output by the captioning device; or
optimizing the captioning device through a semantic correlation between an image triplet and a corresponding generated sentence, wherein the image triplet comprises a query image, a positive image, and a negative image.

3. The method according to claim 2, wherein the optimizing the captioning device by performing the adversarial training on the captioning device through the sentence discriminator comprises:
extracting a preset first sample set, wherein each first sample comprises an image and a corresponding true sentence;
extracting a pre-established generative adversarial network, wherein the generative adversarial network comprises a captioning device and the sentence discriminator, wherein the captioning device is configured to perform an image-encoding on an input image and then perform a sentence-decoding to obtain a pseudo sentence, and the sentence discriminator is configured to determine whether the input sentence is the pseudo sentence output by the captioning device; and
selecting a first sample from the first sample set based on a machine learning method, and performing first training steps of:
inputting an image in the selected first sample into the captioning device to output a pseudo sentence;
inputting the pseudo sentence and a true sentence in the selected first sample into the sentence discriminator to output a discrimination result;
calculating an accuracy rate of the sentence discriminator according to the output discrimination result; and
determining that a training of the captioning device is completed in response to the accuracy rate reaching a preset value.

4. The method according to claim 3, wherein the method further comprises the step of:

calculating, in response to that the accuracy rate does not reach the preset value, an adversarial loss of the sentence discriminator, adjusting a relevant parameter of the sentence discriminator to reduce the adversarial loss, and re-selecting a first sample from the first sample set to continue performing the first training steps.

5. The method according to claim 3, wherein the method further comprises the step of:

calculating, in response to that the accuracy rate does not reach the preset value, an adversarial reward of the sentence discriminator, adjusting a relevant parameter of the sentence discriminator to increase the adversarial reward, and re-selecting a first sample from the first sample set to continue performing the first training steps.

6. The method according to claim 2, wherein the optimizing the captioning device through the inclusion degree of the object identified by the captioning device in the sentence output by the captioning device comprises:

extracting a preset second sample set, wherein each second sample comprises an image; and selecting a sample from the second sample set based on a machine learning method, and performing second training steps of:

inputting an image in the selected second sample into an image encoder of the captioning device to output a sample object set;

inputting the sample object set into a sentence decoder of the captioning device to output a pseudo sentence;

calculating a confidence mean score of that the pseudo sentence contains sample objects of the sample object set as an object inclusion reward of the pseudo sentence; and determining that a training of the captioning device is completed in response to the object inclusion reward reaching a preset inclusion reward threshold.

7. The method according to claim 6, wherein the method further comprises the step of:

adjusting, in response to that the object inclusion reward does not reach the preset inclusion reward threshold, a relevant parameter of the captioning device to increase the object inclusion reward, and re-selecting a second sample from the second sample set to continue performing the second training steps.

8. The method according to claim 2, wherein the optimizing the captioning device through the semantic correlation between the image triplet and the corresponding generated sentence comprises:

extracting a preset third sample set, wherein each third sample comprises a query image, a positive image and a negative image, the positive image and the query image share at least two objects, and the negative image and the query image have no common object; and selecting a third sample from the third sample set based on a machine learning method, and performing third training steps of:

inputting a query image, a positive image, and a negative image in the selected third sample into the captioning device to output a query sentence, a positive sentence, and a negative sentence, respectively;

calculating a first semantic similarity of the query sentence and the positive sentence and calculating a second semantic similarity of the query sentence and the negative sentence;

calculating a self-supervised triplet loss according to the first semantic similarity and the second semantic similarity; and determining that a training of the captioning device is completed in response to the self-supervised triplet loss being less than a preset loss threshold.

9. The method according to claim 8, wherein the method further comprises the step of:

adjusting, in response to the self-supervised triplet loss being not less than the preset loss threshold, a relevant parameter of the captioning device to reduce the self-supervised triplet loss, and re-selecting a third sample from the third sample set to continue performing the third training steps.

10. The method according to claim 8, wherein the calculating the first semantic similarity of the query sentence and the positive sentence and calculating the second semantic similarity of the query sentence and the negative sentence comprises:

calculating, for the query sentence, the positive sentence and the negative sentence, an object-based probability distribution of each word in the sentences, performing a maximum pooling operation, and obtaining a query sentence feature, a positive sentence feature and a negative sentence feature, respectively; and calculating a first semantic similarity of the query sentence feature and the positive sentence feature and calculating a second semantic similarity of the query sentence feature and the negative sentence feature.

11. The method according to claim 2, wherein the method further comprises the step of:

adjusting, in response to that a weighted sum of the adversarial reward, the object inclusion reward, and the self-supervised triplet loss is greater than a preset target value, a relevant parameters of the captioning device to reduce the weighted sum.

12. The method according to claim 1, wherein the image encoder comprises a two-layer LSTM with an area-level attention mechanism, wherein a first layer LSTM serves as a top-down attention module that calculates an object-level attention according to context information, and a second layer LSTM is a language model for generating a sentence.

13. The method according to claim 1, wherein the method further comprises outputting a caption by:

acquiring a to-be-processed image; and inputting the image into the obtained captioning device, and outputting the caption corresponding to the image.

14. An apparatus for generating a captioning device, comprising:

one or more processors; and a storage apparatus, storing one or more computer programs, wherein the one or more computer programs, when executed by the one or more processors, cause the one or more processors to perform operations, the operations comprising:

acquiring a sample image set;

inputting the sample image set into an image encoder of a sentence generator to output an object set;

dividing the object set into a first object set and a second object set, wherein the first object set is an object set included in a preset object set, and the second object set is an object set excluded from the preset object set;

inputting the object set output by the image encoder into a sentence decoder of the sentence generator, and perform a beam search by using the first object set and the second object set as constraint conditions in a decoding step to generate a pseudo image-sentence pair set; and training the sentence generator by using the pseudo image-sentence pair set as a sample set to obtain the captioning device.

15. The apparatus according to claim 14, wherein the operations further compromise:

acquiring a to-be-processed image; and inputting the image into the obtained captioning device, and outputting the caption corresponding to the image.

16. A non-transitory computer readable medium, storing a computer program, wherein the program, when executed by a processor, causes the processor to perform operations, the operations comprising:

acquiring a sample image set;

inputting the sample image set into an image encoder of a sentence generator to output an object set;

dividing the object set into a first object set and a second object set, wherein the first object set is an object set included in a preset object set, and the second object set is an object set excluded from the preset object set;

inputting the object set output by the image encoder into a sentence decoder of the sentence generator, and perform a beam search by using the first object set and the second object set as constraint conditions in a decoding step to generate a pseudo image-sentence pair set; and training the sentence generator by using the pseudo image-sentence pair set as a sample set to obtain the captioning device.

* * * * *